United States Patent
Guan et al.

(10) Patent No.: US 8,818,020 B2
(45) Date of Patent: Aug. 26, 2014

(54) METHOD OF PROVIDING SECURITY FOR TRANSMITTING A DIGITAL MEDICAL IMAGE

(75) Inventors: Yong Liang Guan, Singapore (SG); Chueh Loo Poh, Singapore (SG)

(73) Assignee: Nanyang Technological University, Singapore (SG)

( * ) Notice: Subject to any disclaimer, the term of this patent is extended or adjusted under 35 U.S.C. 154(b) by 214 days.

(21) Appl. No.: 13/496,822

(22) PCT Filed: Sep. 20, 2010

(86) PCT No.: PCT/SG2010/000353
§ 371 (c)(1),
(2), (4) Date: Mar. 16, 2012

(87) PCT Pub. No.: WO2011/034507
PCT Pub. Date: Mar. 24, 2011

(65) Prior Publication Data
US 2012/0269412 A1    Oct. 25, 2012

Related U.S. Application Data (60) Provisional application No. 61/243,621, filed on Sep. 18, 2009.

(51) Int. Cl.
*G06K 9/00* (2006.01)
*G06T 1/00* (2006.01)

(52) U.S. Cl.
CPC ....... *G06T 1/0028* (2013.01); *G06T 2201/0061* (2013.01); *G06T 2201/0203* (2013.01)
USPC .......................................... 382/100; 713/176

(58) Field of Classification Search
USPC ............ 382/100, 232; 380/54, 210, 252, 287; 713/176; 704/200.1, 273; 381/73.1; 348/460, 463
See application file for complete search history.

(56) References Cited

U.S. PATENT DOCUMENTS

| | | | |
|---|---|---|---|
| 6,504,941 B2 | 1/2003 | Wong | |
| 6,633,653 B1 | 10/2003 | Hobson et al. | |
| 6,671,387 B1 | 12/2003 | Chen et al. | |
| 6,831,990 B2 * | 12/2004 | Marvel et al. | 382/100 |
| 7,003,666 B1 * | 2/2006 | Inoue et al. | 713/176 |
| 7,181,043 B2 * | 2/2007 | Iwamura | 382/100 |
| 7,212,649 B2 * | 5/2007 | Watanabe et al. | 382/100 |
| 7,222,235 B1 * | 5/2007 | Mitsui | 713/176 |
| 7,532,738 B2 * | 5/2009 | Hashimoto et al. | 382/100 |
| 7,545,938 B2 * | 6/2009 | Nomizu et al. | 380/220 |
| 2003/0070075 A1 * | 4/2003 | Deguillaume et al. | 713/176 |
| 2005/0193206 A1 * | 9/2005 | Kunisa et al. | 713/176 |

* cited by examiner

*Primary Examiner* — Anand Bhatnagar
(74) *Attorney, Agent, or Firm* — Sughrue Mion, PLLC (57) ABSTRACT

A method of preparing a digital medical image for secure transmission, the method comprising embedding data into the digital medical image using a reversible watermarking process, generating a code for tamper detection and localization from the digital medical image using a computational function, and embedding the code for tamper detection and localization into the digital medical image using the reversible watermarking process; and a method of reviewing a digital medical image prepared by the method of preparing, the method of reviewing comprising retrieving the code for tamper detection and localization from the digital medical image; reversing the watermarking processes to obtain a restored image; generating a code from the restored image using the computational function; and comparing the retrieved code for tamper detection and localization with the code generated from the restored image to detect and locate tampering.

9 Claims, 6 Drawing Sheets

METHOD OF PROVIDING SECURITY FOR TRANSMITTING A DIGITAL MEDICAL IMAGE

TECHNICAL FIELD

This invention relates to security for digital medical image transmission.

BACKGROUND

Hospitals routinely transmit medical images only within their internal network which is protected by their firewall. However, with the advent of tele-radiology, there is an increasing need for doctors to transmit images to healthcare professionals all over the globe to seek high quality diagnoses or second opinions. As a result, medical image security has become an important issue when medical images are being transmitted over open network, where sensitive patient information is exposed to hackers or individuals with malicious intents. Possible security breaches may include tampering of images to include false data which may lead to wrong diagnosis and treatment.

There are several mandates and guidelines in place to protect sensitive patient information. The Health Insurance Portability and Accountability Act (HIPAA) requires healthcare providers to take measures to ensure the security of medical images so as to protect patient's privacy. The Digital Imaging and Communication in Medicine (DICOM) standard a s to define a technical framework for application entities involved in the exchange of medical data to adhere to a set of security profiles. At present the DICOM standard does not address the security of patient data after it has been decrypted, and when it is no longer under the protection the private network.

Current security measures have their limitations. Cryptography is able to ensure security in terms of storage and transmission but once decrypted the information is no longer protected. Firewalls and access-control methods only protect the images up to the point of the internal networks. Authenticity problems are often a result of human actions such as illegal distribution or human error in transmitting to unauthorized individual. To ensure the authenticity of the images, the two common tools used are digital signature and watermark.

A digital signature is the non-repudiation, encrypted version of the message digest extracted from the data to prove integrity and originality. The security of digital signature often depends on the strength of the hash functions used to validate the signatures. It has been demonstrated that it is possible to generate two datasets with different content but having the same MD5 (Message-Digest algorithm 5) hash. As a result, it is then possible to append arbitrary data to the dataset and their hash value may still be the same. In mathematical terms, if $MD5(x)=MD5(y)$, then $MD5(x+q)=MD5(y+q)$[6] (where x and y could represent two different 128 bytes dataset and q is an arbitrary dataset of any length). We can then apply these concepts to medical images, for example, by modifying the first 1024 bits of the pixel values of an image. Consequently, two images can be nearly identical except for six pixels and the two images can produce the same MD5 hash. This shows that it could be possible for a hacker to tamper an image to include artifacts that may lead to wrong medical diagnosis, while keeping the MD5 of the image unchanged. This type of tampering may also give rise to serious security issues if the image was used in a legal or police investigation.

Watermarking is the practice of imperceptibly adding hidden data to the cover-signal (e.g. image, audio, video, or other work of media) in order to convey the hidden data. In the context of medical images, the hidden data can be used to verify the authenticity of the images. This provides an alternative technique to protect medical images. It allows messages to be indiscernibly embedded into an image by modifying the pixel values. Watermarks may be permanent or reversible. Permanent watermarks permanently modify the image in some controlled ways, while reversible watermarks allow these modifications to be completely reversed subsequently by an authorized person.

Because digital medical images can be easily modified, there is also a need to identify whether tampering has been performed on the images during transmission, and to locate the regions that have been tampered with.

SUMMARY

This application describes a method of securely transmitting digital medical images comprising a secure and fully reversible watermarking scheme which is capable of verifying authenticity and integrity of DICOM images. The reversible watermarking utilizes a secret random location signal which is encrypted using public-key for security. A tampering detection and localization function is incorporated using a dual layer watermarking technique.

According to a first exemplary aspect, there is provided a method of preparing a digital medical image for secure transmission, the method comprising embedding data into the digital medical image using a reversible watermarking process; generating a code for tamper detection and localization from the digital medical image using a computational function; and embedding the code for tamper detection and localization into the digital medical image using the reversible watermarking process.

Embedding the metadata using the reversible watermark process may comprise dividing the digital medical image into non-overlapping pixel blocks, generating a random location signal designating one pixel of each non-overlapping pixel block as an estimator pixel, and embedding the metadata into one or more of the non-overlapping blocks as required.

The method may further comprise encrypting the random location signal using public key cryptography.

The method may further comprise embedding a digital envelope into the digital medical image after embedding the metadata, the digital envelope comprising a concatenation of a bit stream of the encrypted random location signal, a cyclic redundancy code computed for the random location signal and a hash of the digital medical image.

Generating the code for tamper detection and localization from the digital medical image may comprise dividing the digital medical image into non-overlapping pixel blocks and computing a cyclic redundancy code for each non-overlapping pixel block. Embedding the code for tamper detection and localization using the reversible watermark process may comprise embedding each cyclic redundancy code into the non-overlapping pixel block for which the cyclic redundancy code was computed.

According to a second exemplary aspect, there is provided a method of reviewing a digital medical image prepared by the method of the first aspect, the method of the second aspect comprising retrieving the code for tamper detection and localization from the digital medical image; reversing the watermarking processes to obtain a restored image; generating a code from the restored image using the computational function; and comparing the retrieved code for tamper detection and localization with the code generated from the restored image to detect and locate tampering.

Generating the code from the restored image may comprise dividing the restored image into non-overlapping pixel blocks and computing a cyclic redundancy code for each non-overlapping pixel block of the restored image.

According to a third exemplary aspect, there is provided a method of securely transmitting a digital medical image, the method comprising preparing the digital medical image using the method of the first aspect; transmitting the prepared digital medical image; and reviewing the prepared digital medical image using the method of the second aspect.

According to a fourth exemplary aspect, there is provided a digital medical image prepared for secure transmission using the method of the first aspect.

BRIEF DESCRIPTION OF THE DRAWINGS

In order that the present invention may be fully understood and readily put into practical effect, an embodiment of the invention will now be described by way of non-limitative example, the description being with reference to the accompanying illustrative drawings, in which.

DETAILED DESCRIPTION

Exemplary embodiments of methods of preparing and reviewing a digital medical image 10 will be described with reference to FIGS. 1 to 9.

When preparing the digital medical image 10 for secure transmission, before watermarking the digital medical image 10, it is preferable to preprocess the digital medical image 10. To do so, underflow and overflow conditions are taken care of to ensure that the selected digital medical image is suitable for watermarking.

Before the digital medical image 10 is watermarked, the image depth has to be taken into account. For a digital medical image of p bits depth, there will be $2^P-1$ possible gray levels. Occurrence of an underflow or overflow condition implies that pixel range of the digital medical image has been exceeded.

An underflow will occur if an intended pixel to be watermarked has a pixel of gray value equal to 0. Consequently, subtracting one gray level from this pixel will result in a negative value.

An overflow will take place if the intended pixel to be watermarked has a pixel of gray value equal to the maximum allowable pixel value of $2^P-1$, for example, 255 for an 8-bit grayscale image. Hence, adding one gray value to the pixel will exceed the maximum value for a p-bit image. As a result, pixels that have pixel gray values 0 or $2^P-1$ are not modifiable. DICOM images are generally stored using 16-bits per pixel and imaging modalities usually do not produce images that utilize the full range of pixel values. Thus, in an exemplary embodiment, all image pixels are shifted up by four pixel values. This will be described in more detail below. After transmission of the digital medical image, upon receipt of the digital medical image, the gray levels of the digital medical image are restored to their original values by subtracting all the pixels by four after dewatermarking.

Figure 8:
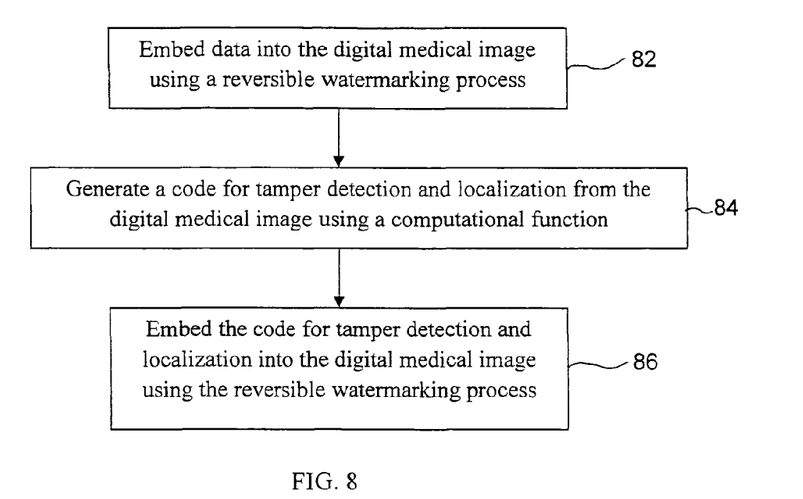
FIG. 8 is a flowchart of a method of preparing a digital medical image for secure transmission.

When preparing the digital medical image 10 for secure transmission as shown in FIG. 8, data is preferably embedded into the digital medical image using a reversible watermarking process 82. The embedding process seeks to protect data or source information such as patient and image metadata by watermarking it into the image using a random location signal. In this way, there is no need to transmit the metadata together with the image since it is embedded into the image. This ensures that a hacker would not be able to easily separate the image header, delete it and create a new one.

Figure 1:
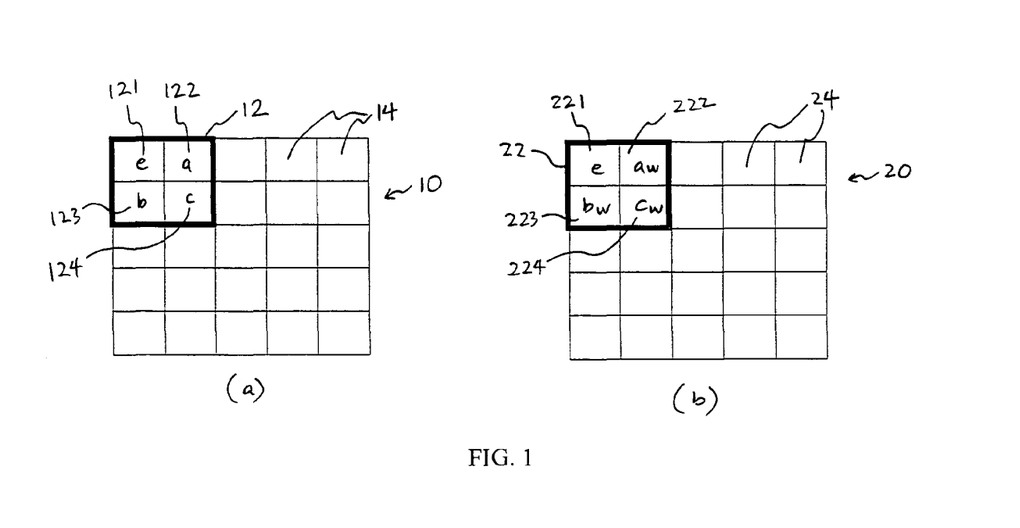
FIG. 1(a) is a schematic illustration of embedding data such as a message.
FIG. 1(b) is a schematic illustration of extracting the embedded data of FIG. 1(a)

The digital medical image 10 is first divided into 2×2 non-overlapping blocks 12 of 2×2 pixels 14, as shown in FIG. 1 (a). Considering each block 12 of 2×2 pixels, data comprising a binary message (msg) is embedded according to the following steps:

1. Generate a random location signal that denotes or designates one of the four possible pixel positions 121, 122, 123, 124 in a 2×2 non-overlapping block 12 where an estimator pixel e is to reside. Use of the random location signal is to ensure that it will be more difficult to decipher which of the four pixel 121, 122, 123, 124 is used as the estimator pixel e. Only one pixel (121 as shown) is designated as the estimator pixel e, 121 in each 2×2 non-overlapping block 12. Referring to FIG. 1(a), a, b and c represent pixels 122, 123, 124 in the 2×2 block 12.

2. Select one pixel of the block, e.g. pixel a, 122, and compare it with the estimator pixel e, 121.
3. If it is satisfied that |estimator−a|<2, then pixel a, 122, is able to carry one bit and is modified as follows:
   a. If msg(i)=1 then a is changed to $a_w$=a+2
   b. If msg(i)=0 then a is changed to $a_w$=a−2
   A difference of 2 is used in order to increase embedding capacity.
4. If it is not satisfied that |estimator−a|<2, then a difference between the estimator and a is increased by 2 by changing a.
5. Steps 4 to 6 are repeated with remaining pixels b and c.
6. Steps 1 to 5 are repeated until all the data or message bits have been embedded or all the non-overlapping blocks 12 had been processed, as required depending on length of the data or message. In this way, a prepared digital medical image 20 as shown in FIG. 1(*b*) is obtained.

For data extraction, the prepared digital medical image 20 is divided into the same 2×2 non-overlapping blocks 22 of 2×2 pixels 24 each, as shown in FIG. 1(*b*). The location of the estimator pixel e, 221 is known using the random location signal. Referring to FIG. 1(*b*), $a_w$, $b_w$ and $c_w$ represent pixels 222, 223, 224 in the 2×2 block 22 in the prepared digital medical image 20. Using the estimator, the pixels 221, 222, 223, 224 can be restored and the hidden or embedded data or message is extracted according to the following steps:
1. If $a_w$> estimator then change $a_w$ to $a_r$=$a_w$−2
2. If $a_w$< estimator then change $a_w$ to $a_r$=$a_w$+2
3. The decoder will consider that a bit "1" was embedded if |$a_r$−estimator|<2, and vice versa.

All the pixels 24 will be increased by 4 pixel values to avoid underflow because pixels which are allowed to be modified will be changed by ±2 and this value is increased by a factor of 2 with dual layer watermarking (described in further detail below). Hence, to avoid overflow, the maximum pixel value allowable for an image to be watermarked is calculated by equation (2) below:

$$\text{Maximum pixel limit} = 2^p - 1 - q - r \qquad (2)$$

where p is the bits depth of the image, q is the increase in all pixel values (i.e. 4) and r is the pixel values allowed for modification (i.e. 2×2). Hence, this method supports 16-bit images with maximum pixel values of 65527.

The security of this method depends on the ability to keep the estimator location 121 secret. Hence, in order to keep the random location signal secure, a cryptography system known as public-key cryptography or asymmetric cryptography is used to encrypt the random location signal. The public-key cryptography makes use of a pair of codes (also known as the public and private key) to encrypt a message. The signal which is encrypted using the public key can only be decrypted using the corresponding private key. The main advantage of using the public-key cryptography is that the public key and the private key are mathematically related but it is computationally infeasible to deduce one key from the other. In the present method, the random location signal is encrypted using an RSA cryptosystem which bases security on the difficulty of factoring large integers.

In practice, in order for a radiologist (e.g. the sender) to send an image to a doctor (e.g. the recipient) in another hospital, he would encrypt the random location signal with the doctor's public key (which is widely distributed). Upon receiving the image, the doctor can only retrieve the embedded data by decrypting the random location signal using his private key, which is kept secret.

In addition to embedding data such as metadata into the digital medical image 10, a digital envelope (DE) is preferably also be embedded into the digital medical image 10 after the last bit of metadata has been embedded. The DE is created by concatenating a bit stream of the encrypted random location signal, a cyclic redundancy code (CRC) computed for the random location signal and a hash of the digital medical image. The hash is preferably obtained using a Secure Hash Algorithm (SHA)-256. The CRC code of the random location signal is computed to serve as a check to ensure that the decrypted random location signal is correct. A standard CRC-32 polynomial used in the IEEE 802.3 (Ethernet) may be employed to compute the CRC. The SHA-256 hash code of the digital medical image 10 is calculated so that it can be used to verify the success of dewatermarking when the prepared digital medical image 20 has been received and is being reviewed by a recipient.

The method also comprises generating a code for tamper detection and localization from the digital medical image 10 using a computational function 84, and embedding the code for tamper detection and localization into the digital medical image 10 using the reversible watermarking process 86.

Tamper detection and localization is useful because integrity control based on an exact preservation of all parts of the digital medical image maybe unnecessarily strict as distortions on the image may also be due to noise originating from the transmission process. Tamper localization will avoid unnecessary requests for retransmission of the digital medical image 10 since it follows that if the tampered area is not within a region of interest, the image may still be considered acceptable by a recipient. Retransmission is undesirable as it may increase delay time and slow down a hospital's network.

In the event that areas in the region of interest have indeed been altered, for example by a hacker for malicious intents, the tamper detection and localization function would be able to detect such alterations. Thus, the recipient of the prepared digital medical image 20 can be alerted that an attack had been carried out on the hospital information system.

Figure 2:
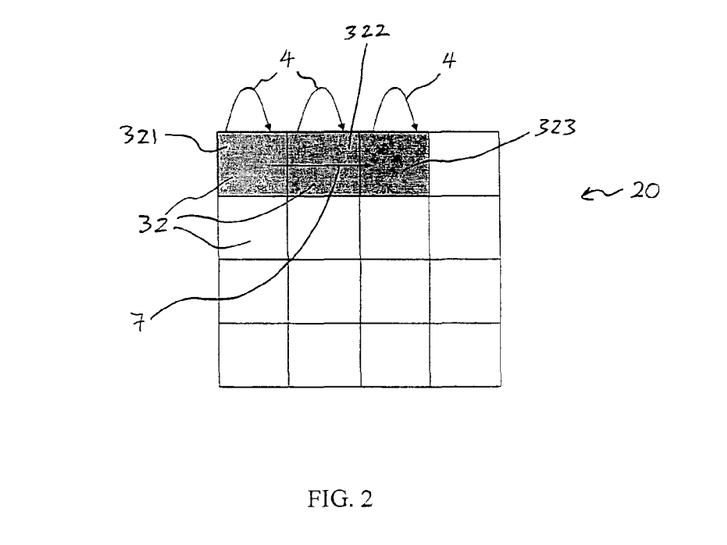
FIG. 2 is a schematic illustration of block-by-block CRC embedding.

FIG. 2 illustrates the tampering detection and localization approach implemented in the method. The digital medical image 10 is first divided into 16×16 non-overlapping pixel blocks 32 and a code for tamper detection and localization is generated. This is done by computing a Cyclic Redundancy Code, CRC-16, which is an error error-checking code, for each of the blocks 32 using a computational function. The computed CRC bits form the code for tamper detection and localization information which is then embedded into the digital medical image 20 using the same reversible watermarking process. Computing the CRC is preferred because it is computationally less intensive as compared to hash functions. This consideration is important because a large number of CRC codes may have to be generated, depending on the size of the image. Computational time become a crucial issue when watermarking medical images of volumes containing multiple slices of DICOM images. In the tamper detection and localization function, the standard CRC-16-CCITT polynomial is used together with a block size of 16×16 pixels. These parameters are selected based on the tradeoff between the area of detection, strength of detection and the capacity to embed the tamper localization information.

Using the same watermarking embedding algorithm, a CRC computed for a particular block 321 is embedded back into that particular block 321, as shown by the arrows 4. In the event that the 16 bits of the CRC computed for a first block 321 cannot be embedded into the first block 321, the remaining bits will be carried over to a second block 322 to be embedded prior to embedding of the CRC of the second block 322, as indicated by the arrow 7. If the remaining CRC bits of the first block 321 and the CRC of the second block 322 can all be embedded into the second block 322, only the CRC of a third block 323 will be embedded into the third block 323 itself. This method is preferred to simply concatenating the CRC as a string spanning all the blocks 32 because the latter will result in a failure to retrieve the CRC of each block 32 when any of the embedded CRC bits is altered.

Figure 3:
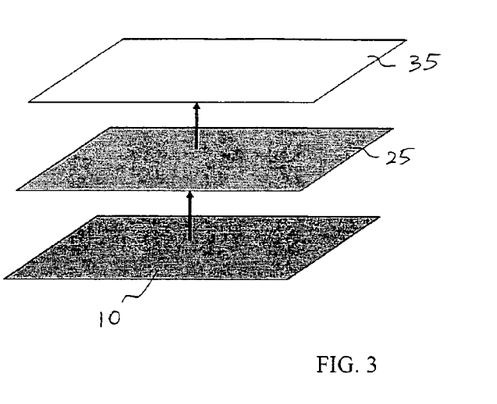
FIG. 3 is a schematic illustration of two layers of watermarking.

FIG. 3 illustrates a layer concept used in the reversible watermarking process of the method. Two layers 25, 35 of watermarking are performed for each digital medical image 10. In the first layer 25, data or source information such as metadata of the image is first embedded, followed by embedding of the digital envelope (DE), as described above. In the second layer 35, the generated code for tamper detection information is embedded as described above. The first layer 25 thus stores information related to the source and information used to check the integrity of the digital medical image 10 and message. The second layer 35 is designated for the tamper detection and localization function. Because of the reversible nature of the watermarking process, it is thus possible to watermark in the two layers 25, 35 and subsequently retrieve information from the first layer 25 by removing the second layer 35 completely. This greatly increases the amount of data that can be embedded in one digital medical image 10.

Figure 9:
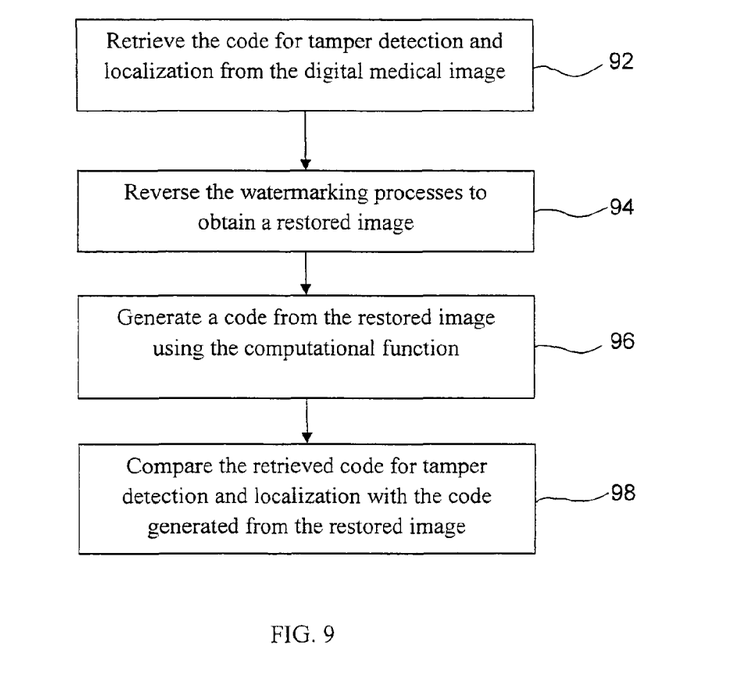
FIG. 9 is a flowchart of reviewing a digital medical image prepared by the method of FIG. 8.

As shown in FIG. 9, when reviewing a transmitted digital medical image that has been prepared by the two layers 25, 35 of watermarking as described above, the code for tamper detection and localization is retrieved from the digital medical image 92 by again dividing the digital medical image into the same 16×16 blocks and extracting the embedded CRC using the steps described above for data extraction. A restored image is obtained by reversing the watermarking processes 94, i.e., remove both layers 25, 35 of watermarking. A code is generated from the restored image using the same computational function that generated the code for tamper detection and localization 96. The code generated from the restored image thus comprises the CRC of each 16×16 pixel block of the restored image. By comparing the retrieved code for tamper detection and localization with the code generated from the restored image 98, if both CRCs for a same block of pixels do not match, that block will be identified as having been tampered with, hence achieving tamper localization concurrently with tamper detection. Using the tamper detection and localization function, it is thus possible to determine if and exactly where modifications have been made to an image.

Sample medical images in DICOM format were used to test the method. The image types used were those from Magnetic Resonance Imaging (MRI), Computed Tomography (CT), Ultrasound (US) and X-Ray Angiography (XA). Four important performance metrics were studied:

1. Embedding capacity: A measure of embedding capacity is necessary to ensure that sufficient authentication information can be embedded into the image.
2. Imperceptibility: This is to test the quality of the medical images in terms of the invisibility of the watermark.
3. Run time: The time taken for the watermarking and dewatermarking process of an image should be assessed to ensure that it does not slow down the hospital's information system.
4. Robustness against tampering: This measure addresses the effectiveness of the tamper detection and localization function for detecting and locating alterations of pixels.

Embedding Capacity

Each sample image was embedded to its maximum capacity. The Peak-Signal-to-Noise-Ratio (PSNR) and Mean-Squared-Error (MSE) were calculated by comparing each original image with its watermarked image. Four sample images from different modalities and of different image sizes were selected for the test. The DICOM test images were obtained from third party software, in this instance OsiriX Image Navigation Software. None of the images used in the review had a maximum pixel value greater than 65527 which is a requirement for the watermarking process to handle overflow and underflow. Table 1 below summarizes the performance results.

TABLE 1

| Image Type | Image Size | Bits Per Pixel | Maximum Amount of Data That Can Be Embedded (Bits) | MSE | PSNR (dB) | Run Time (s) |
| --- | --- | --- | --- | --- | --- | --- |
| MRI | 512 × 512 | 16 | 74190 | 21.5 | 34.8 | 5.48 |
| XA | 1024 × 1024 | 8 | 581524 | 20.7 | 35.0 | 20.7 |
| US | 480 × 640 | 16 | 79865 | 21.9 | 34.7 | 6.36 |
| CT | 512 × 512 | 8 | 127078 | 21.9 | 34.7 | 6.00 |

The number of bits that can be embedded for the four test images ranged from 74190 to 581524 bits. For a larger image size, the maximum number of bits that can be embedded increases. For example, 581524 bits of information can be embedded into an XA image, which has the largest image size of 1024×1024 pixels. This was the largest embedding capacity of all four test cases. This is expected as more pixels are available for the hiding of information bits using the reversible watermarking process. Although the MR and CT image were of the same size, there was a difference in embedding capacity. This is mainly because watermarking process is dependent on the pixel correlation of the image. Higher correlation (i.e. high similarity between pixel values) will result in higher embedding capacity.

Imperceptibility

Figure 4:
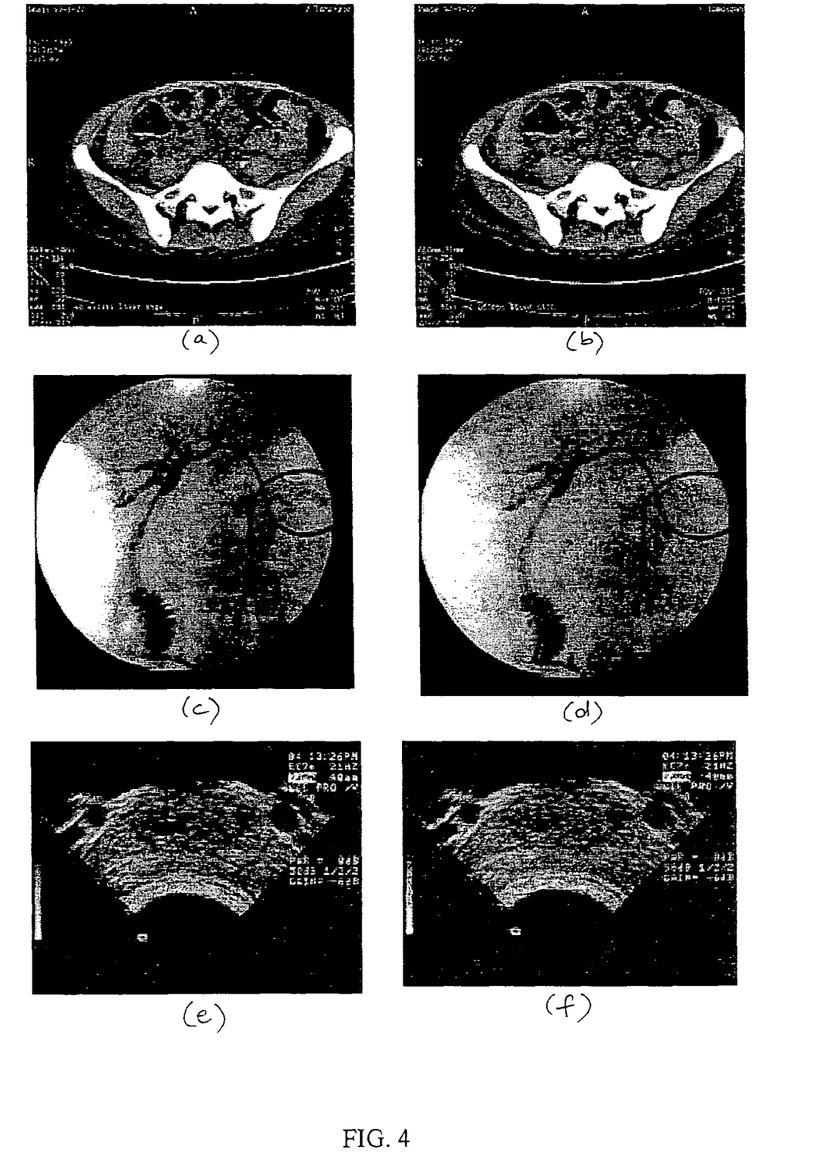
FIG. 4(a) is a Computed Tomography (CT) image.
FIG. 4(b) is the CT image of FIG. 4(a) after watermarking.
FIG. 4(c) is an X-Ray Angiography (XA) image.
FIG. 4(d) is the XA image of FIG. 4(c) after watermarking.
FIG. 4(e) is an Ultrasound (US) image.
FIG. 4(f) is the US image of FIG. 4(u) after watermarking.

The PSNR calculated for all images ranged between 34 and 35 dB. FIG. 4 shows that images embedded at maximum capacity, i.e., FIGS. 4 (b), (d) and (f) are visually indistinguishable from the corresponding original images, i.e. FIGS. 4 (a), (c) and (e). It should be noted that a higher PSNR might not necessary translate to a better image quality. For example, a small distortion in a region of interest might still result in a high PSNR but will have a significant impact on diagnosis results. Hence, it is important that original images can always be restored, as provided for in the method by using the reversible watermarking process.

Run Time

Time taken for watermarking and dewatermarking is an important factor to consider for practical use in any hospital system. It should not slow down the hospital's information system. The results showed that the time taken to prepare the test images and subsequently review them was an average of 9 seconds.

Robustness Against Tampering

Figure 5:
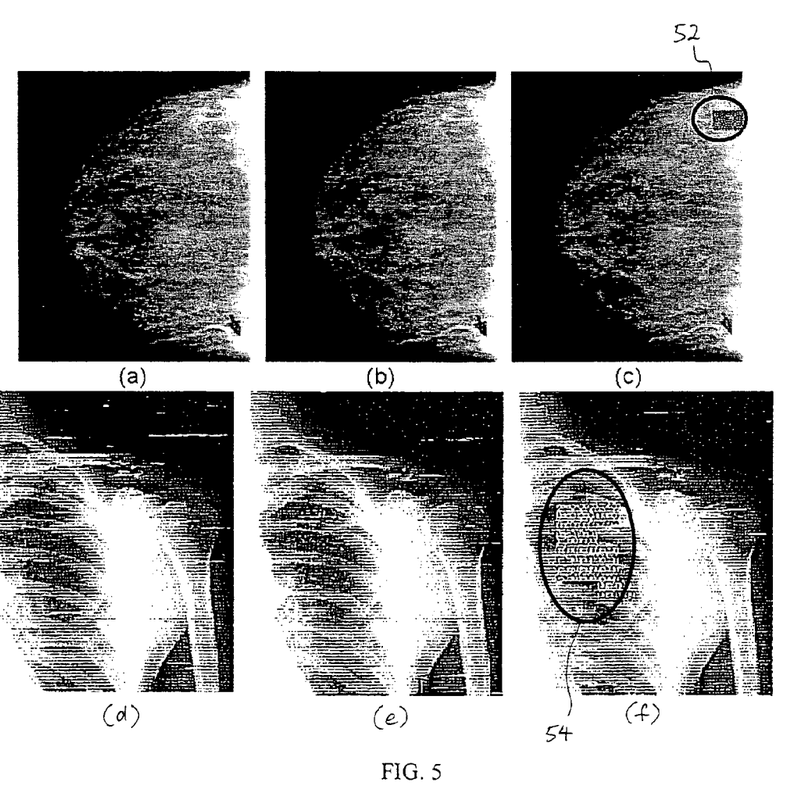
FIG. 5(a) is a mammogram image.
FIG. 5(b) is the mammogram image of FIG. 5(a) after tampering to add tumor-like features.
FIG. 5(c) is the mammogram image of FIG. 5(b) displaying localization of the tampering.
FIG. 5(d) is an X-Ray image.
FIG. 5(e) is the X-Ray image of FIG. 5(d) after tampering to add features that indicate lung infection.
FIG. 5(f) is the X-Ray image of FIG. 5(e) displaying localization of the tampering.

In order to demonstrate the tamper detection and localization function in detecting forgery, counterfeited images were created by manually modifying the pixel values in the watermarked images using an image processing software, in this instance ImageJ. FIGS. 5 (b) and (e) are two samples of counterfeited images while FIGS. 5(c) and (f) show the corresponding images with tampered regions being localized by the tamper detection and localization function. The localized tampered blocks are shown in shaded boxes as circled 52, 54 in FIGS. 5(c) and (f).

Figure 6:
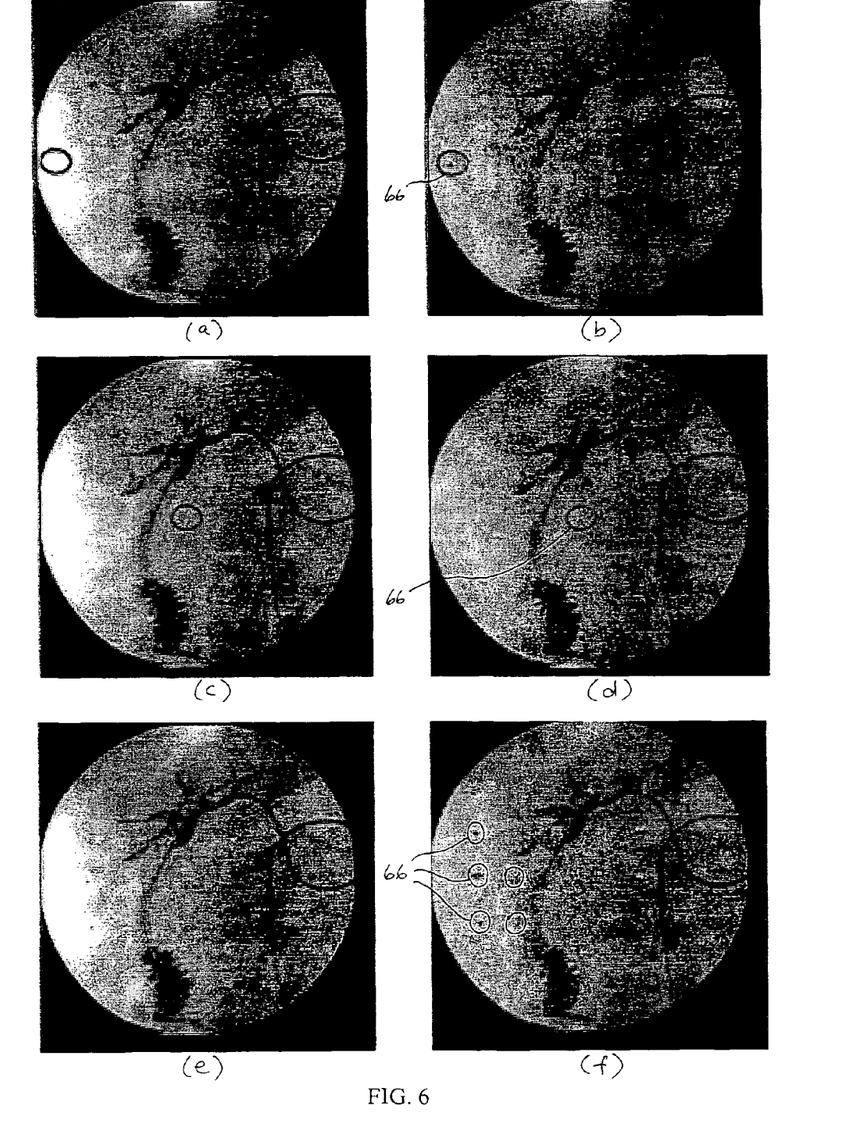
FIG. 6(a) is an XA image with 1 pixel of tampering.
FIG. 6(b) is the XA image of FIG. 6(a) displaying localization of the tampering.
FIG. 6(c) is an XA image with an 8×8 pixel block of tampering.
FIG. 6(d) is the XA image of FIG. 6(c) displaying localization of the tampering.
FIG. 6(e) is an XA image with multiple 8×8 pixel blocks of tampering.
FIG. 6(f) is the XA image of FIG. 6(e) displaying localization of the tampering.
Figure 7:
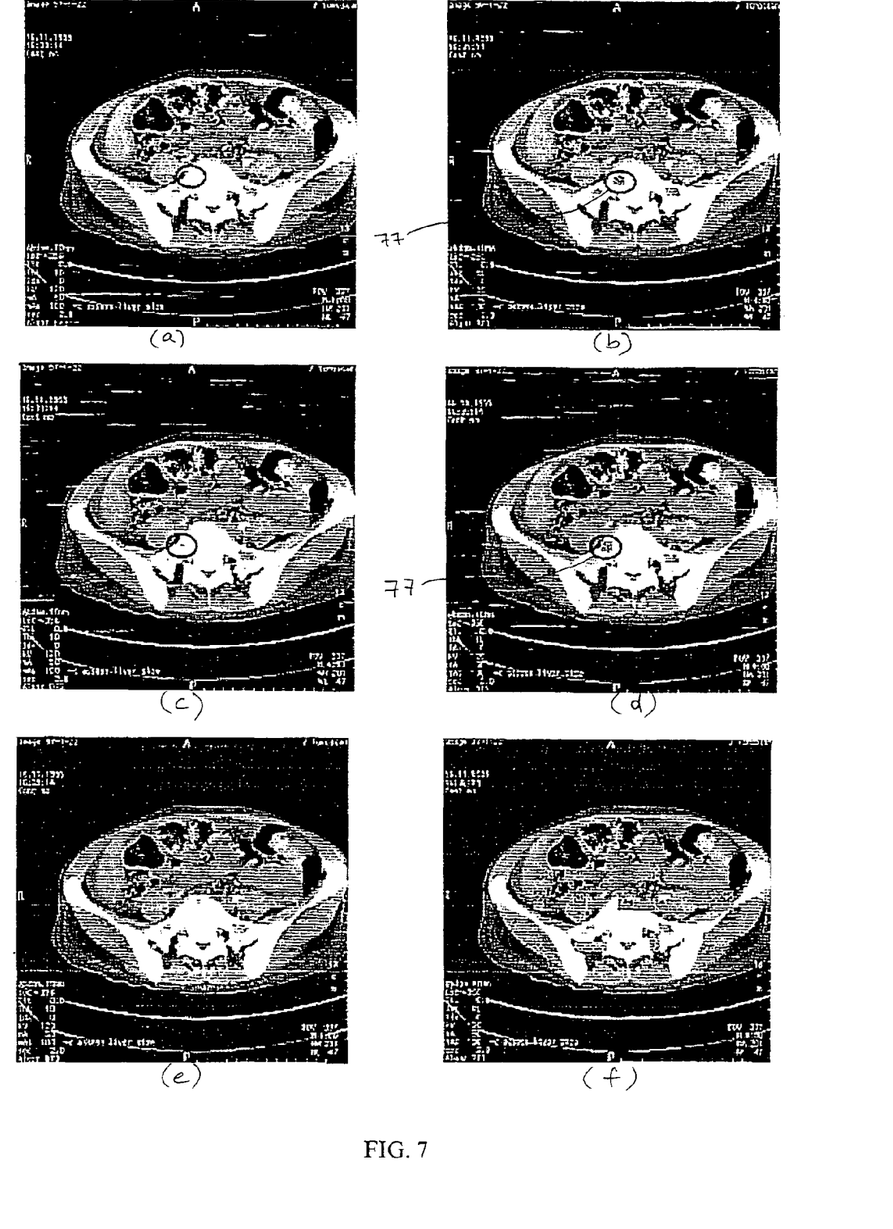
FIG. 7(a) is a CT image with 1 pixel of tampering.
FIG. 7(b) is the CT image of FIG. 7(a) displaying localization of the tampering.
FIG. 7(c) is a CT image with an 8×8 pixel block of tampering.
FIG. 7(d) is the CT image of FIG. 7(c) displaying localization of the tampering.
FIG. 7(e) is a CT image with multiple 8×8 pixel blocks of tampering.
FIG. 7(f) is the CT image of FIG. 7(e) displaying localization of the tampering.

The watermarked images of FIGS. 4 (b) and (d) were also put through a systematic tampering test. The tampering test included tampering a single pixel, tampering a single block of size 8×8 bits and tampering a spread of 8×8 bit sized blocks. FIGS. 6 and 7 show representative results obtained using the tamper detection and localization function for an XA image and a CT image respectively. Tamper locations are indicated by circling 66, 77. The results show that the tamper detection and localization function was able to achieve a 100% detection and localization rate, down to one pixel of tampering.

Whilst there has been described in the foregoing description preferred embodiments of the present invention, it will be understood by those skilled in the technology concerned that many variations or modifications in details of design or construction may be made without departing from the present invention.

The invention claimed is:

1. A method of preparing a digital medical image for secure transmission, the method comprising:
   embedding metadata into the digital medical image using a reversible watermarking process;
   generating a code for tamper detection and localization from the digital medical image using a computational function; and
   embedding the code for tamper detection and localization into the digital medical image using the reversible watermarking process,
   wherein embedding the metadata using the reversible watermark process comprises dividing the digital medical image into non-overlapping pixel blocks, generating a random location signal designating one pixel of each non-overlapping pixel block as an estimator pixel, and embedding the metadata into one or more of the non-overlapping blocks as required.

2. A method of reviewing a digital medical image prepared by the method of claim 1, the method of reviewing comprising:
   retrieving the code for tamper detection and localization from the digital medical image;
   reversing the watermarking processes to obtain a restored image;
   generating a code from the restored image using the computational function; and
   comparing the retrieved code for tamper detection and localization with the code generated from the restored image to detect and locate tampering.

3. The method of claim 2, wherein generating the code from the restored image comprises dividing the restored image into non-overlapping pixel blocks and computing a cyclic redundancy code for each non-overlapping pixel block of the restored image.

4. The method of claim 1, further comprising encrypting the random location signal using public key cryptography.

5. The method of claim 4, further comprising embedding a digital envelope into the digital medical image after embedding the metadata, the digital envelope comprising a concatenation of a bit stream of the encrypted random location signal, a cyclic redundancy code computed for the random location signal and a hash of the digital medical image.

6. The method of claim 1, wherein generating the code for tamper detection and localization from the digital medical image comprises dividing the digital medical image into non-overlapping pixel blocks and computing a cyclic redundancy code for each non-overlapping pixel block.

7. The method of claim 6, wherein embedding the code for tamper detection and localization using the reversible watermark process comprises embedding each cyclic redundancy code into the non-overlapping pixel block for which the cyclic redundancy code was computed.

8. A digital medical image prepared for secure transmission using the method of claim 1 or any one of claims 4 to 7.

9. A method of securely transmitting a digital medical image, the method comprising:
   preparing the digital medical image using a method of:
      embedding metadata into the digital medical image using a reversible watermarking process;
      generating a code for tamper detection and localization from the digital medical image using a computational function; and
      embedding the code for tamper detection and localization into the digital medical image using the reversible watermarking process,
      wherein embedding the metadata using the reversible watermark process comprises dividing the digital medical image into non-overlapping pixel blocks, generating a random location signal designating one pixel of each non-overlapping pixel block as an estimator pixel, and embedding the metadata into one or more of the non-overlapping blocks as required;
   transmitting the prepared digital medical image; and
   reviewing the prepared digital medical image using a method of:
      retrieving the code for tamper detection and localization from the digital medical image;
      reversing the watermarking processes to obtain a restored image;
      generating a code from the restored image using the computational function; and
      comparing the retrieved code for tamper detection and localization with the code generated from the restored image to detect and locate tampering.

* * * * *